July 27, 1965   F. W. AMOS ETAL   3,196,526
METHOD OF MAKING TURBINE BLADES
Filed June 12, 1962   2 Sheets-Sheet 1
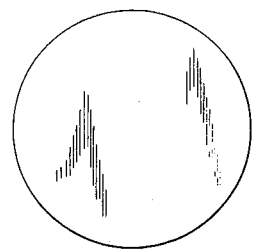
FIG. 1a.
FIG. 2.
FIG. 3.
FIG. 1b.
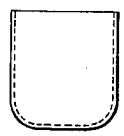
FIG. 4.
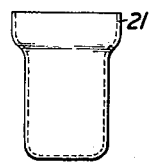
FIG. 5.
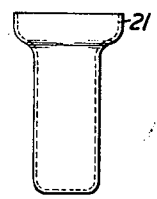
FIG. 6.
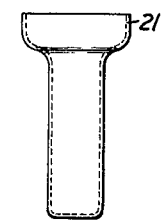
FIG. 7.
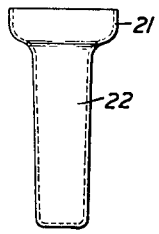
FIG. 8.
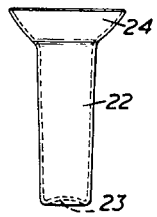
FIG. 9.
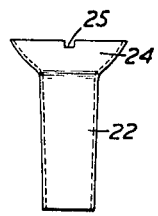
FIG. 10.
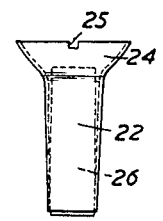
FIG. 11.
INVENTORS
FREDERICK W. AMOS
FRANK T. WHEATLEY
LEONARD W. WICKENS
ARTHUR W. S. MANGLES
BY
WATSON, COLE, GRINDLE + WATSON
ATTORNEYS July 27, 1965  F. W. AMOS ETAL  3,196,526
METHOD OF MAKING TURBINE BLADES
Filed June 12, 1962  2 Sheets-Sheet 2

INVENTORS
FREDERICK W. AMOS
FRANK T. WHEATLEY
LEONARD W. WICKENS
ARTHUR W. S. MANGLES
BY Watson, Cole, Grindle + Watson
ATTORNEYS

United States Patent Office 3,196,526
Patented July 27, 1965

3,196,526
METHOD OF MAKING TURBINE BLADES
Frederick Walter Amos, Stanmore, Frank Thomas Wheatley, Edgware, and Leonard William Wickens and Arthur William Steward Mangles, London, England, assignors, by mesne assignments, to Bristol Siddeley Engines, Limited, Bristol, England, a British company
Claims priority, application Great Britain, June 13, 1961, 21,328/61
Filed June 12, 1962, Ser. No. 201,906
7 Claims. (Cl. 29—156.8)

This invention relates to methods of making hollow turbine or compressor blades more cheaply than by casting them and also to blades when so made.

The present invention consists in a method of making a hollow turbine or compressor blade by pressing from a tube or from a tube first formed from flat sheet material in which the blade is formed at one end with an integral hollow platform, and this is joined to a separately made root by swaging the edge of the platform over a part of the root. In addition the joint may also be brazed.

The tube may be of uniform thickness, or may have thinner wall portions where the blade edges are to be, formed perhaps by grinding eccentrically; it may also be tapered or of uniform diameter, while it is envisaged that the tube need not be of circular section.

To avoid the necessity of having special tube for each different shape of blade, it is preferred that the tube is formed, as by drawing, from sheet material. Standard tube could also be spun or turned to appropriate size. The hollow tubular blade may also be formed directly from sheet material by flow turning.

Conveniently the tube is first formed with a skirt which is later formed into the platform when the rest of the tube is pressed into blade form. The skirt may be conical or of diverging triangular section, for example.

Normally all machining operations will be completed before the tube is pressed to final shape, but trimming of the skirt to lenght may be necessary afterwards.

During pressing, the tube may contain a solidified fluid such as wax to assist correct blade formation, and the temperature will be controlled to ensure that the wax viscosity is as designed.

Preferably it is arranged that the root is correctly located, for example by a jig, before fixing, and that no further machining is performed.

Blades may be made in various ways embodying the invention, and one method will now be described by way of example, with reference to the accompanying drawings, in which:

FIGURES 1a and 1b are plan and elevation respectively of a sheet nimonic alloy disc from which the blade, blade platform, and platform skirt, are to be formed;

FIGURES 2 to 15 show successive stages in the formation of blade, platform, and skirt;

The disc of FIGURE 1 is deep drawn in successive stages in a press using successive pairs of appropriately-shaped tools. FIGURES 2 to 9 show the shape of the alloy after each of the eight drawing operations. First an open-ended cylinder is formed and the depth is increased at the expense of the diameter. Then the lower portion is successively deepened and reduced in diameter (FIGURES 5 to 8), leaving an upper "tray" 21, which will eventually be formed into the platform and skirt.

It should be noted that the deep "stalk" 22 of FIGURE 8 is slightly conical downwards.

The final drawing operation causes the bottom of the stalk 22 to re-enter at 23 and puts the tray 21 into frusto-conical shape as shown at 24.

Then follow three cutting operations. The cone 24 is notched at 25 to provide a reference; the top and bottom are milled or ground off to the correct length; and the external surface is ground. The grinding of the stalk is eccentric to leave thinner walls where the leading and trailing blade edges are to be.

Figure 12:
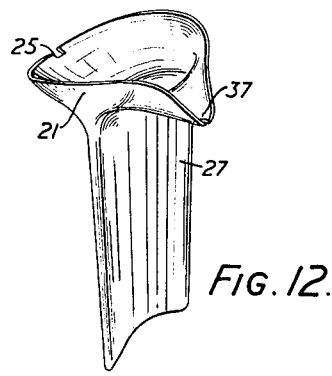
Figure 13:
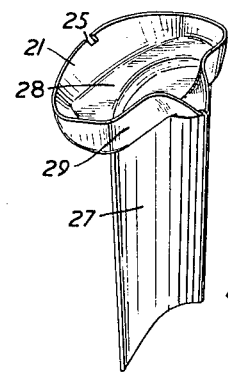
Figure 14:
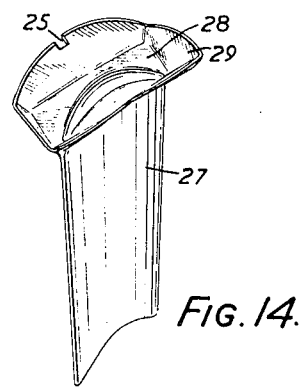

The piece of FIGURE 11 is then given three coin-pressing operations in which the blade 27 is formed from the ground stalk 22 and the platforms 28 and skirt 29 are formed from the cone 24. For these operations, the stalk 22 is filled with wax 26 to prevent deformation. The successive shapes are shown in FIGURES 12 to 14. During these stages the blank is correctly orientated by means of the notch 25, and the wax 26 is squeezed out at top and bottom as necessary. (The wax is not shown in FIGURES 12 to 15 for clarity).

Figure 15:
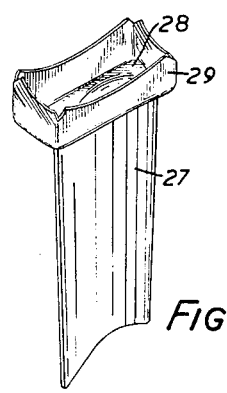

The piece of FIGURE 14 is then drawn through a rectangular die to bring up square the sides of the skirt 29 (FIGURE 15).

These four operations are carried out at a predetermined temperature to ensure that the wax has the appropriate viscosity, since this affects the final shape.

Figures 16A, 16B:
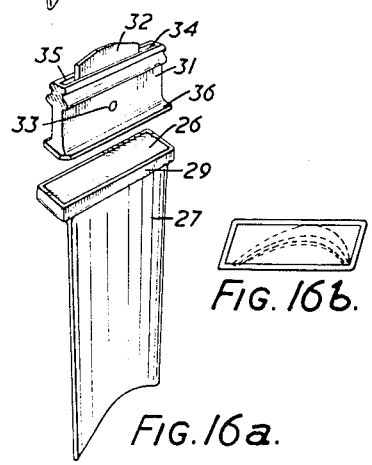
FIGURE 16a is an exploded view showing how the root and spreader are introduced to the formed blade and platform.
FIGURE 16b is a plan view of the formed blade and platform.

Then the ends of the skirt 29 are ground off and the blank is given a final coin-pressing so that it is ready for the root 31 as shown in FIGURE 16.

The root 31 is a casting made by a lost-wax process and is in its final form before being introduced to the blade and platform. It has a rectangular slot containing a spreader plate 32 which is held in place by a pin 33 to leave at either edge a passage 34 or 35 for diverting cooling air to the leading and trailing edges of the blade during operation. The spreader plate may if desired be shaped to extend into the hollow cavity of the aerofoil section.

Figure 17:
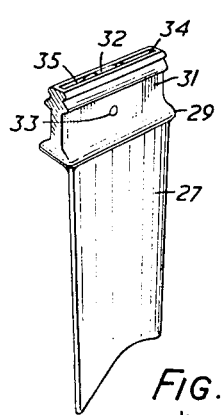
FIGURE 17 is a view of the completed blade.

The wax 26 is melted out from the platform skirt and is partly replaced by brazing material. Then the root and spreader are inserted in the skirt and located in a jig before the skirt 29 is swaged over the end flange 36 on the root, and the assembly is brazed together to provide the finished blade (FIGURE 17). The high temperature brazing is also a stress-relieving operation.

There is no machining after swaging and brazing and throughout there are only three metal cutting operations on the material of the blade blank.

Although the pieces shown in FIGURE 9 have been described as being drawn from flat in successive operations, it would also be possible to spin them or flow-turn them, for example from sheet or from tube of appropriate diameter and thickness.

The root could be solid so that the hollow blade reduces weight without requiring to pass cooling air, and this kind of blade might well be of value in a compressor where temperatures are not so high. In any case, the different components can be made of appropriate material, for example the blade could be made of creep-resistant nimonic alloy, the root of lower quality creep-resistant material, and the spreader (if any) of heat-resistant material.

FIGURE 12 shows a pointed protrusion 37 formed in the cone 21 prior to the formation of the platform 28; the protrusion 37 subsequently is in the centre of one long side of the platform.

In a modification of the platform-forming method described above, the cone 21 is first formed into a generally triangular section, with one apex corresponding to the protrusion 37 and the other two respectively forming subsequently the two corners of the other long side of the platform.

What we claim as our invention and desire to secure by Letters Patent is:

1. A method of making a hollow metal blade for an elastic fluid machine including the steps of forming a jointless metal tube from blank flat sheet material, forming the end of the length of the tube into a blade platform, forming the other part of the length of the tube into a blade section, and swaging the edge of the platform over a part of a separately made metal blade root of finished shape such that the rest of the blade root may be attached to a turbine wheel.

2. A method as claimed in claim 1 in which the formation of the blade platform is performed by first forming a flared skirt at one end of the tube and then forming the flared skirt into a platform of box-like formation.

3. A method as claimed in claim 2 in which the blade platform and blade section are formed by successive pressing operations between dies.

4. A method as claimed in claim 3 in which the tube is filled with wax prior to pressing between dies.

5. A method as claimed in claim 1 in which the blade root is hollow and a spreader is positioned in the root.

6. A method of making a hollow metal blade for an elastic fluid machine including the steps of providing a jointless metal tube, forming the end of the length of the tube into a blade platform by successive pressing operations, forming the other part of the length of the tube into a blade section by successive pressing operations, and swaging the edge of the platform over a part of a separately made metal blade root of finished shape such that the rest of the blade root may be attached to a turbine wheel.

7. A method as claimed in claim 6 in which the blade platform is formed by forming a flared skirt at one end of the length of the tube and then forming the skirt into a blade platform of box-like form.

References Cited by the Examiner

UNITED STATES PATENTS

| | | | |
|---|---|---|---|
| 1,908,074 | 5/33 | Squires | 29—156.8 |
| 2,613,058 | 10/52 | Atkinson. | |
| 2,819,870 | 1/58 | Wayne. | |
| 2,823,894 | 2/58 | Gerdan et al. | 253—39.15 |
| 2,843,926 | 7/58 | Turner | 29—511 |
| 2,853,272 | 9/58 | Odds | 253—77 |
| 2,940,726 | 6/60 | Dennis | 253—77 |
| 2,979,809 | 4/61 | Dennis | 253—77 |

FOREIGN PATENTS 896,555   5/44   France.

WHITMORE A. WILTZ, *Primary Examiner.*

WALTER BERLOWITZ, *Examiner.*